Dec. 9, 1952         D. G. IHRIG         2,621,317
BATTERY CHARGING SYSTEM
Filed Aug. 5, 1948         2 SHEETS—SHEET 1
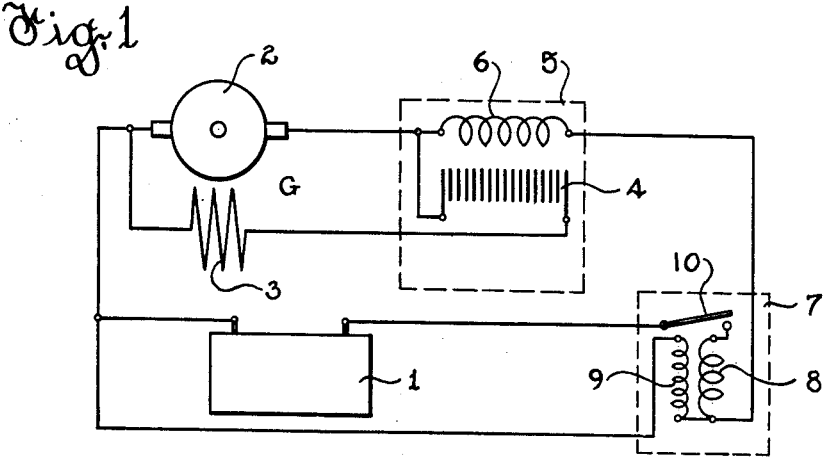
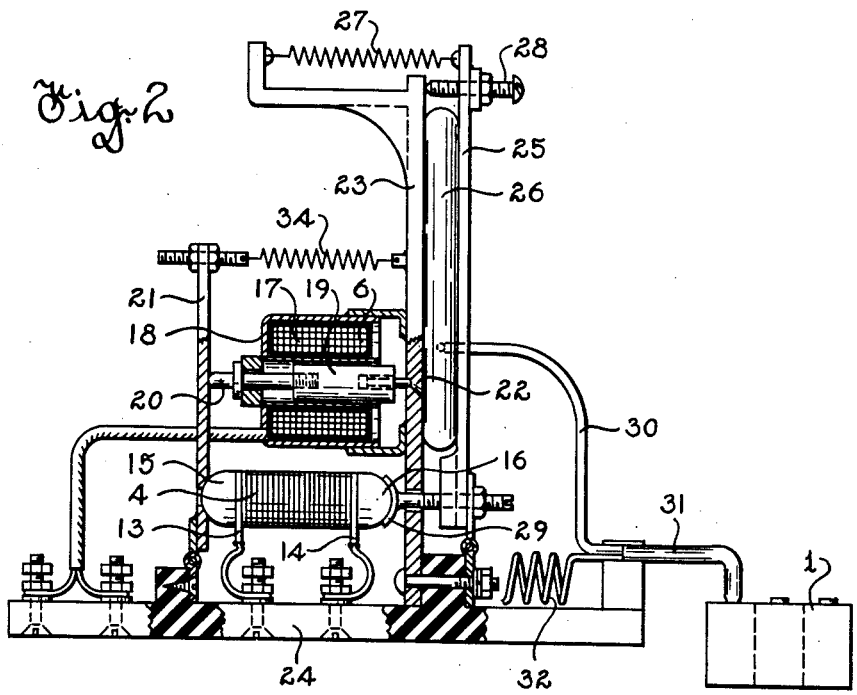
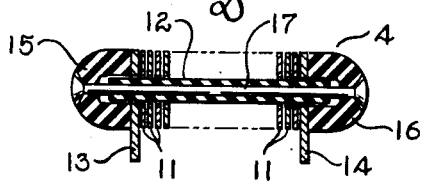
Inventor
Donald D. Ihrig
By Arthur Sinon
Attorney

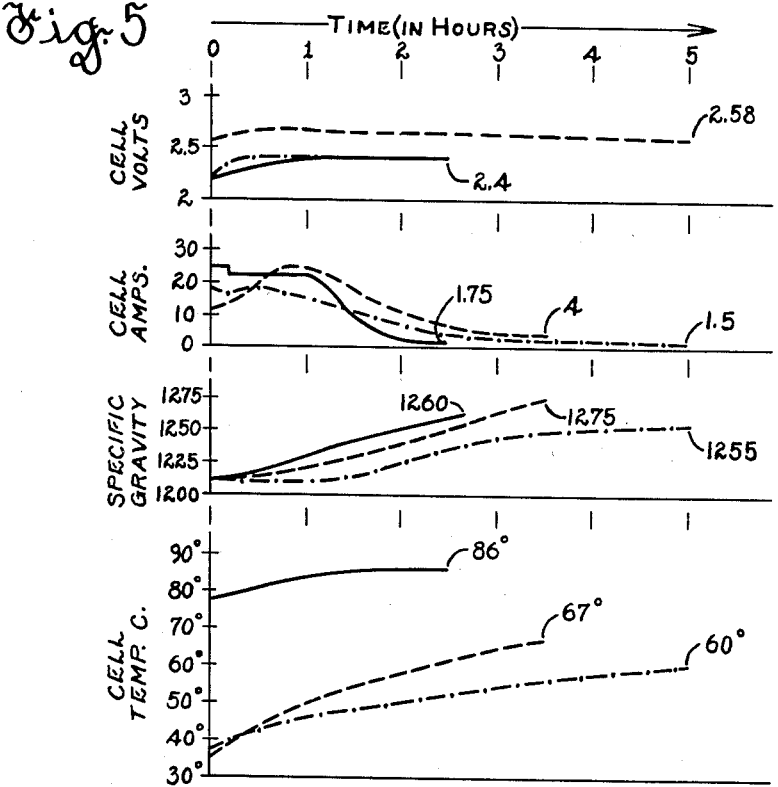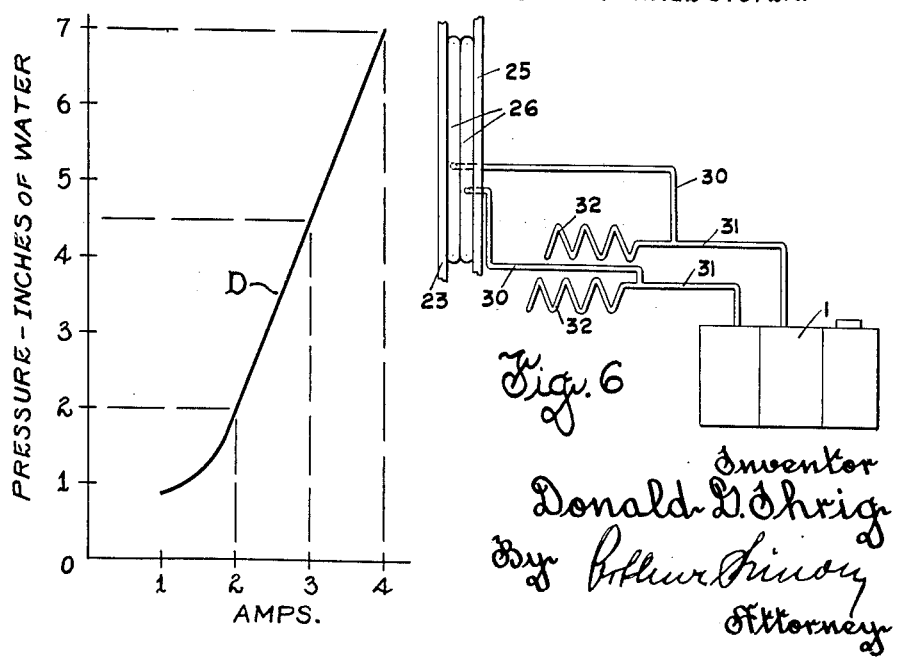

Patented Dec. 9, 1952

2,621,317

UNITED STATES PATENT OFFICE 2,621,317

BATTERY CHARGING SYSTEM

Donald G. Ihrig, Evanston, Ill.

Application August 5, 1948, Serial No. 42,590

1 Claim. (Cl. 320—31)

My invention relates to improvements in battery charging controllers whereby the magnitude of the current supplied to a battery is controlled in accordance with the relation between the battery voltage and the voltage of the source, such relation being modified in accordance with the rate of gas generation in the battery as an incident of charging.

In my copending application Serial Number 721,541, filed January 11, 1947, for Battery Charging Control, it has been pointed out that the ability of a battery to receive a charging current varies not only with the state of charge, but also with the temperature of the battery. Most battery charging systems hitherto known respond to the battery voltage in the manner that the charging current is relatively high when the battery voltage is relatively low and vice versa, the control being responsive to a voltage responsive relay or equivalent device. In other systems the battery is charged intermittently at a predetermined voltage and charging is started and terminated upon predetermined departures from said given voltage. The voltage difference between a fully charged and a discharged battery is very small and therefore such voltage responsive charging regulators are very sensitive and require a great deal of maintenance. Furthermore, for a given charge the voltage of the battery varies with the temperature and it is therefore necessary for practical purposes to adjust the voltage responsive charging system for an average temperature with the result that at high temperature the regulator may cause serious overcharge and excessive gasing and at low temperatures it may cause continued undercharging and resulting sulfation of the battery. For instance at 110° F. a certain type of battery when approaching full charge should have impressed thereon a cell voltage of 2.3 volts. At 30° F. the corresponding voltage should be 2.65 volts per cell.

Still other systems are combinations of the foregoing, whereby the battery is initially charged with a constant current, which current is reduced as the voltage of the battery increases. The latter systems are complicated and thus difficult of adjustment and maintenance and they do not respond to the temperature of the battery which greatly affects its capacity to store up energy. Overcharging results in lowered efficiency and in generation of heat and gas which when the rate is too high require excess maintenance and permanently injures the battery. On the other hand, continued low charge causes sulfation of the battery.

The rate at which gas is formed is dependent upon the magnitude of the charging current, the state of charge of the battery, and the temperature of the battery. The three conditions named are closely interrelated. I have determined by test that the rate of gas formation in a fully charged battery is affected only to a negligible extent by the temperature. Thus by providing a charging system which depends upon the rate of formation of gas of a charged battery at a relatively low current value, a system is provided which functions efficiently under all operating conditions.

At low temperatures a partly discharged cell, which is being charged at a high rate, will cause gas generation at a high rate, while at high temperature and the same state of charge, the battery will generate very little gas. As will appear hereafter, the system in accordance with the present invention therefore will charge the cold battery at a relatively high rate, and will reduce the rate in both cases to a safe value as the battery approaches its fully charged conditions. The present system is particularly advantageous in connection with batteries for automotive purposes. With a battery charging controller which is set for a fixed voltage limit, the amount of charge delivered to a battery during cold weather is low, while during hot weather the battery is overcharged. On the other hand, the load demand during cold weather is high and it is low during hot weather. The present system prevents injurious gasing due to a high rate of charge under any temperature conditions and thus charges the battery at all times without the chance of overcharging and resulting injury.

In my aforementioned application a system is disclosed wherein charging of a battery is terminated when the rate of gas liberation by the battery during charging exceeds a given value. The present invention provides means which normally tend to maintain the charging current at a high value which is adjusted in accordance with the rate of generation of gas as an incident of the state of charge of the battery.

An object of the invention is to provide a battery charging system which is responsive to the charging current and to the rate of gas liberation by the battery as an incident of charging.

Another object is to provide a system of the aforementioned type employing a generator having variable voltage output.

Another object is to provide a system which automatically maintains the charging rate of a battery at all times at the highest safe value consistent with its state of charge.

Another object is to provide a battery charging controller of the aforementioned type which is simple and reliable in operation and which is easily adjusted for different operating conditions.

Another object is to provide a controller which prevents an excessive charging rate under all conditions of charge of a battery.

Another object is to provide a system which is equally efficient for a wide range of battery and ambient air temperatures.

Other objects and advantages will hereinafter appear.

The accompanying drawing is illustrative of an embodiment of the invention. In the drawing, Fig. 1 is a diagram of connections of a charging system embodying my invention.

Fig. 2 is a drawing of a regulator forming part of the system shown in Fig. 1, while Fig. 3 is a detailed drawing of an element of the apparatus shown in Figs. 1 and 2.

Figs. 4 and 5 show certain charging characteristics of lead batteries.

Fig. 6 is a detailed view of certain modifications of the regulator.

Referring to Fig. 1, the same illustrates a battery 1 which may be charged from a generator G, such as an automobile generator. The generator is provided with an armature 2 and a shunt field winding 3. One terminal of the winding 3 is connected to one brush of the armature 2, while the other terminal of the field winding is connected in series with a carbon pile resistor 4 of a regulator 5 connected to the second terminal of the armature. The regulator 5 is provided with a magnetizing coil 6, one terminal of which is connected to the common terminal of the armature 2 and the resistor 4. The system further includes a conventional battery cutout relay 7, comprising a series coil 8, a shunt coil 9 and a magnetizable contact lever 10. The system as connected affords the following circuits: From the armature 2 through the coils 6 and 9 back to the armature. A second circuit extends from the armature 2 through the carbon pile 4, and the shunt field winding 3 back to the armature. When the generator voltage is above a given value, the coil 9 attracts the lever 10 and another circuit is established from the armature through the coils 6 and 8, over lever 10, through the battery 1 to the armature 2, so that charging current flows from the generator to the battery.

If the battery voltage for any reason exceeds that of the generator, the current through the coil 8 is reversed, so that said coil counteracts the coil 9 and the lever 10 is released to disconnect the battery from the generator.

While charging the battery, the generator voltage is controlled by variations of the current in the shunt field winding 3, by means of the regulator 5 as will be explained hereinafter.

The regulator 5 is illustrated more in detail in Figs. 2 and 3. The carbon pile resistor 4 as shown in Fig. 3 comprises a number of carbon discs or rings 11 which are mounted on an insulating tubing 12. The pile is connected in circuit by means of terminals 13 and 14, respectively, arranged at opposite ends of the pile. The pile of carbon rings may be compressed to reduce the resistance thereof by a pair of insulating end caps 15 and 16, respectively, which are adapted to slide on the tubing 12. A headed rod 17 passes through the tubing 12 and the end caps 15 and 16 for holding the parts of the resistor loosely together while permitting compression of the carbon rings by axial pressure between the end caps 15 and 16.

The regulator illustrated in Fig. 2 is constructed and operates as follows: An electromagnet 17 is provided with a ferromagnetic frame 18 and a reciprocable armature 19. The armature has a forward non-magnetic extension 20, which bears against a lever 21 intermediate of its ends, and which is provided with a collar to limit its inward movement. The rear end of the armature slidingly engages a guide pin 22 mounted on a stationary bracket or frame 23, which also serves as a support for the magnet frame 18. The magnet is energized by the coil 6. One end of the lever 21 is pivotally supported on a base plate 24 of insulating material which is rigidly connected with the frame 23. Lever 21 is biased toward the armature 19 by an adjustable tension spring 34. A second lever 25 is also pivoted on the base plate 24. Inserted between the lever 25 and the frame 23 is an inflatable bag 26 of rubber or the like. The lever 25 is biased towards the bag, tending to collapse the same by an adjustable tension spring 27, its movement being limited by an adjustable stop 28. Interposed between the levers 21 and 25 is the carbon pile 4 in such a manner that the pull of the springs 34 and 27 tends to compress the pile to reduce its resistance. One end cap 16 of the carbon pile 4 is supported in a socket 29, which is adjustably mounted on the lever 25 in such a manner that the pressure exerted on the carbon pile in relation to the expansion of the bag 26 may be adjusted by the springs 34 and 27. The bag 26 is provided with a connecting hose 30 which is joined in a fluidtight manner to a conduit 31, which in turn is connected in a fluidtight manner to one or several cells of the battery 1, the cell itself being sealed so that any gas generated therein must pass through the conduit 31. The conduit 31 is further provided with a capillary pipe 32 through which gas developed in the cell may escape. The proportions of the pipe 32 are such that the pressure drop of the gas escaping therethrough increases materially with increase in volume. Hence with increasing rate of gas generation, the gas pressure in the cell and in the bag 26 increases. The terminals 13 and 14 of the carbon resistor are connected to suitable binding posts, as are also the terminals of the coil 6.

The system described operates as follows: Let it be assumed that the system is functioning to charge a battery in the usual manner as aforedescribed and that the battery has a low charge so that gas is liberated therein at a very low rate. The lever 25 is then in the extreme position to the left. The charging current passing through the winding 6 rotates the lever 21 counterclockwise against the bias of the spring 34 and thus, depending upon the magnitude of the charging current, varies the resistance of the carbon pile 4 and thus the resistance of the shunt winding circuit to maintain the current flowing to the battery between predetermined limits.

As the battery charge increases, gas is evolved in the battery and escapes through the capillary tube 32. The resistance to the flow of gas through said tube increases with increasing volume, so that the gas pressure in the cell rises. This pressure is communicated to the bag 26 which thereupon tends to expand and thereby pushes against the lever 25 to rotate it clockwise until the force on the lever balances the tension of the tension spring 27. Rotation of the lever 25 reduces the pressure on the carbon pile 4, thereby increasing its resistance and thus reducing the excitation and the current output of the armature 2.

It is to be observed that as long as the evolution of gas is below a given rate, the generator voltage and thus the charging rate is solely controlled by the current coil 6, but as soon as substantial gassing in the battery takes place, the charging rate is modified by the action of the bag 26 in response to the gas pressure in the cell. The gas pressure modifies the action of coil 6 because when gassing occurs and the member 25 swings outwardly reducing the pressure between the disks 11, the spring 34 is free to swing the member 21 toward the right to move the extension 21 of the armature 19 to its stop position as shown in Fig. 2. This makes it possible to adjust the regulator so that normally the current coil 6 tends to maintain a relatively high charging rate at all times, but when such rate would become excessive either by excessive speed of the armature or upon evolution of gas when the generator tends to overcharge, the generator voltage is reduced in accordance with such tendency.

It is to be noted that during actual charging the parts are in the position shown in Fig. 2 and that there is substantially no physical displacement of the lever 25 but that the change in pressure of the gas in the bellows 26 effects the loading of the rheostat by the spring 27. Thus as the pressure of the gas increases, it counteracts the spring 27 so that less pressure is exerted on the disks 11 and hence more resistance is included in the output circuit and less current flows to the battery. Substantial movement of the lever 25 only occurs under abnormal conditions. This action occurs because as previously noted the proportions of the pipe 32 are such that the pressure drop of the gases escaping therethrough increases materially with increase in volume so while pressure builds up in the bag 26, it does so at substantially constant volume.

It may be desirable to employ two bellows and connect them individually to different cells as a safety measure to provide for possible gas leaks in a cell. In that case the two bellows would jointly actuate the lever 25 as shown in Fig. 6. In case of a gas leak in one cell, the response of the apparatus to the rate of gas generation and hence the charging rate for a given gas pressure will be modified somewhat, but the tendency of overcharging is still reduced.

Fig. 4 shows the result of a test to determine the relation between the battery charging current and the gas pressure evolved in a battery provided with a controller in accordance with the invention. In the test the capillary tube 32 had an inside diameter of $\frac{1}{32}''$ and a length of 72''. As shown in curve D, with a charging current of 2 amperes, the gas pressure was 2'' of water column, while with a current of 3 amperes the gas pressure rose to 4½'' of water column. Thus it is apparent that the gas pressure rises rapidly with increasing current so that the response of the device affords a very effective regulating force.

Fig. 5 is a composite graph of tests illustrating the conditions of charging a battery by the conventional constant potential method as compared with the conditions obtaining when employing the present system. The graph shows the cell voltage, the charging current and the specific gravity of the liquid with reference to charging time. The tests were conducted for two different cell temperatures obtaining at the beginning of the test. The controller built in accordance with the invention was so adjusted that charging under normal cell temperature proceeded in the same manner as when charging with a constant voltage of 2.4 volts per cell and the results of the tests for normal cell temperature are substantially identical for both methods of charging and are shown by the full lines in the graph.

The dotted lines illustrate the charging conditions of a cold battery having a starting temperature of 35° F., and an electrolyte starting gravity of 1210 when it is charged with a controller in accordance with the present invention; while the dash dot lines show the charging condition of a cold battery having the same starting temperature of 35° F. and the same electrolyte starting gravity of 1210, when it is charged at a constant voltage of 2.4 volts. The regulators were in both cases so adjusted that with normal battery temperature the charging effects upon the battery were substantially the same.

When charging with the controller embodying the present invention, the charging current rose from 12 at the start to 22 amperes maximum during the first hour of charging and then tapered off again to 4 amperes after 3½ hours' charging, while the charging voltage varied between 2.58 and 2.69 volts during charging. The specific gravity rose to 1275 after 3½ hours. The total charging energy was 48.4 ampere hours after 3½ hours with an end temperature of the battery of 67° F.

When charging with the constant voltage charger the charging current never exceeded 18 amperes and tapered off to 3 amperes in 3½ hours and to 1½ amperes in 5 hours, while the specific gravity rose to 1255. The total energy input was 34.6 ampere hours after 3½ hours and 37.8 ampere hours after 5 hours while the end temperature was 60° F.

It will be seen that with the system incorporating the invention the battery was charged at a higher rate and in a shorter time, but the rate of charge did not exceed the safe charging rate of the battery under normal conditions.

Tests with the present system have shown that with a fully charged battery the modifying effect of the gas evolution upon the current input starts at about 2 amperes' charging current, and they further showed that the gas evolved at that current is about 1 cu. ft. in 24 hours.

It will be noted that with a cold battery the charging rate with my system is higher and the charging time for a full charge considerably lower than when charging with constant voltage, thus insuring a better maintenance of the charge of a vehicle battery than is possible with a constant voltage system. Tests further showed the superiority of the present system of charging over that providing a constant charging voltage when charging at high battery temperatures. In the latter event when my system is employed the charging current changes with time in substantially the same manner as when the temperature is normal, while the charging voltage is automatically reduced to compensate for the decreased internal resistance of the battery. When a constant voltage type charger is employed, charging continued for an indefinite time at a relatively high rate. This causes excessive internal losses in the battery with a resulting continuous rise of the battery temperature, excessive gassing and rapid deterioration of the battery. From the foregoing it will be apparent that the present invention automatically controls the charging rate so as to compensate for variation in cell temperature, thus preventing overcharging and undercharging regardless of cell temperature variations.

What I claim as new and desire to secure by Letters Patent is:

In a battery charging system, the combination of a generator having an armature and shunt field winding, a variable rheostat controlling the output of said generator, said rheostat comprising a carbon pile the resistance of which is responsive to longitudinally applied force, a first loading spring under adjusted tension cooperatively engaging an end of said pile to apply a longitudinal force thereto, a gas pressure responsive counter-loading member cooperatively engaging said first spring and adapted to apply a force in opposition to said spring to diminish the force thereof applied to said pile without substantial displacement, means to connect said gas pressure responsive member pneumatically with space above the electrolyte of a battery to be charged including an adjusted extended tube escape passage adapted to vent gas delivered from said battery at a rate equal to the rate of evolution of the same therefrom, a second loading spring under adjusted tension cooperatively engaging the other end of said pile to apply longitudinal force thereto, and electro-magnetic means including a current winding in circuit with the output lead of said generator, and an armature cooperatively engaging said second spring and adapted to exert a force proportional to the charging current delivered from said generator and in opposition to the force of said second spring whereby the battery is charged at a high rate and high current magnitude while the rheostat is under the direct control of said electro-magnetic means to induce gassing and thereafter said gas pressure responsive member becomes effective to reduce the value of said charging current as the battery reaches its full charge.

DONALD G. IHRIG.

REFERENCES CITED

The following references are of record in the file of this patent:

UNITED STATES PATENTS

| Number | Name | Date |
| --- | --- | --- |
| 550,242 | Biddle | Nov. 26, 1895 |
| 688,394 | Creveling | Dec. 10, 1901 |
| 1,034,108 | Halbleib | July 30, 1912 |
| 1,087,289 | Halbleib | Feb. 17, 1914 |
| 1,251,707 | Turbayne | Jan. 1, 1918 |
| 1,539,465 | Chandeysson | May 26, 1925 |
| 1,768,165 | Stokes | June 24, 1930 |
| 1,876,985 | Lippard | Sept. 13, 1932 |
| 1,993,785 | Himes | Mar. 12, 1935 |
| 2,179,885 | Fumagalli | Nov. 14, 1939 |
| 2,204,101 | Fumagalli | June 11, 1940 |